United States Patent [19]

Ford

[11] Patent Number: 5,401,808
[45] Date of Patent: Mar. 28, 1995

[54] POLY(VINYLAMMONIUM FORMATE) AND PROCESS FOR MAKING AMIDINE-CONTAINING POLYMERS

[75] Inventor: Michael E. Ford, Coopersburg, Pa.

[73] Assignee: Air Products and Chemicals, Inc., Allentown, Pa.

[21] Appl. No.: 36,757

[22] Filed: Mar. 25, 1993

[51] Int. Cl.$^6$ .............................................. C08F 8/12
[52] U.S. Cl. .................... 525/328.2; 525/378; 525/379
[58] Field of Search ..................................... 525/328.2

[56] References Cited

U.S. PATENT DOCUMENTS

| | | | |
|---|---|---|---|
| 4,393,174 | 7/1983 | Dawson et al. | 525/369 |
| 4,421,602 | 12/1983 | Brunnmueller et al. | 162/168.2 |
| 4,444,667 | 4/1984 | Burkert et al. | 525/383 |
| 4,578,515 | 3/1986 | Dawson et al. | 525/377 |
| 4,808,683 | 2/1989 | Itagaki et al. | 525/328.2 |
| 4,943,676 | 7/1990 | Pinschmidt, Jr. et al. | 525/383 |
| 4,957,977 | 9/1990 | Itagaki et al. | 525/328.2 |
| 5,064,909 | 11/1991 | Itagaki et al. | 525/328.2 |
| 5,194,492 | 3/1993 | Pinschmidt, Jr. et al. | 525/328.2 |

FOREIGN PATENT DOCUMENTS

61-118406  6/1986  Japan.

OTHER PUBLICATIONS

J. P. Brown, et al., "A Polymeric Drug for Treatment of Inflammatory Bowel Disease", J. Med. Chem., 26, p. 1300, (1983).

Neil S. Isaacs, "Physical Organic Chemistry" John Wiley & Sons, New York, p. 284.

*Primary Examiner*—Bernard Lipman
*Attorney, Agent, or Firm*—Mark L. Rodgers; William F. Marsh

[57] ABSTRACT

Amine functional polymers which are terpolymers made up of randomly linked units of amidine or amidinium formate, N-vinylformamide and either vinylamine or vinylammonium formate are prepared by aqueous hydrolysis of poly(N-vinylformamide) at a temperature in the range of 90° to 175° C., preferably in the presence of a minor amount of ammonia or volatile amine. Best conversions and good control of polymer structure are obtained at 140° to 160° C. with a small concentration of ammonia or alkylamine. Formation of poly(vinylammonium formate) containing no other salts or ionic coproducts is realized by degassing the hydrolyzate to remove ammonia or amine from the polymer solution. The poly(vinylammonium formate) affords distinct advantages in the production of salt-free polymers by catalytic decomposition of impurities. Poly(vinylamines) containing significant amounts of amidine functionality offer advantages in applications where increased basicity is required.

2 Claims, No Drawings ns
POLY(VINYLAMMONIUM FORMATE) AND PROCESS FOR MAKING AMIDINE-CONTAINING POLYMERS

FIELD OF THE INVENTION

This invention relates to poly(vinylammonium formate) and to a process for its manufacture. In another aspect it relates to a process for making amidine-containing terpolymers by controlled aqueous hydrolysis of poly (N-vinyl formamide).

BACKGROUND OF THE INVENTION

Interest in amine functional polymers has grown rapidly in recent years owing to their demonstrated utility in a broad spectrum of operations which capitalize on their solubility in water and their reactivity under relatively mild conditions. Such polymers have found uses as flocculants, filtration aids, paper strengthening agents, in enhanced oil recovery and as crosslinking agents for epoxy resins and polyurethanes. As the commercial value of these polymers has become recognized, more and more attention has been devoted to developing polymers containing amine functionality but tailored to specific needs.

Poly(vinylamine) (pVA) is perhaps the most promising of amine functional polymers because of its simplicity of manufacture and its versatility. Since its theoretical monomeric unit, vinylamine, is unstable, pVA is made indirectly by polymerizing a vinylamide, such as N-vinylformamide, and hydrolyzing the resulting polymer to develop its amine functionality. Complete hydrolysis is difficult if not impossible to achieve and it is well recognized that polymers made by this route and referred to as homopolymers of vinylamine are actually copolymers containing vinylamine units (perhaps as high as 98 mol percent) and N-vinylformamide units. A third unit, amidine, has also been recognized as an impurity which is to be minimized in order to increase primary amine functionality.

It has been known for over a decade that hydrochloric acid hydrolysis of poly(N-vinylacetamide) does not produce an absolute homopolymer but a product containing both amine and amidine units resulting from the acid-catalyzed condensation of adjacent amine and acetamido groups. See J. P. Brown et al., Journal of Medicinal Chemistry, 26, 1300 (1983). This article, citing unpublished work of Dawson and Brock, states on page 1304 that the amidine formation can be avoided by use of alkaline hydrolysis media.

U.S. Pat. No. 4,393,174, Dawson et al. (1983) expands on the Brown et al. disclosure in describing the preparation of poly(N-vinylacetamide) and poly(N-vinylformamide) with subsequent hydrolysis to poly(vinylamine) which is useful in making polymeric dyes. It is pointed out that hydrolysis of the amide groups is not easy and has typically been carried out in refluxing aqueous hydrochloric acid. Such conditions are said to result in amidine formation as an impurity which can be avoided by carrying out the hydrolysis at temperatures between 110° and 170° C. in an aqueous strong base such as NaOH.

U.S. Pat. No. 4,421,602, Brunnmueller et al., (1983) discloses making homopolymers of N-vinylformamide which are partially hydrolyzed so that from 10 to 90% of the formyl groups are split off to obtain a polymer containing 90 to 10 mol percent vinylamine units and 10 to 90 mol percent N-vinylamide units in random distribution. The product described has no amidine units. Hydrolysis conditions disclosed involve the use of acids or bases at temperatures from 20° to 200° C. Particularly preferred temperatures are 70° to 90° C., which is the range within which all the operative examples fall. When using acid hydrolysis, exemplified by hydrochloric acid, the pH is 0 to 5. In an alkaline medium, exemplified by 10% sodium hydroxide solution, the pH is 9 to 14. It is stated that it is also possible to use ammonia, an amine or an alkaline earth metal base such as calcium hydroxide, or aqueous solutions of ammonia or an amine. This is not demonstrated, but it states that if the solvolysis is carried out in ammonia or an amine, formamide or a substituted formamide is obtained as a by-product.

The use of ammonia or a primary or secondary amine in the manufacture of water soluble poly(vinylamine) is disclosed in Japanese Laid-Open Patent Application No. 61-118406 (1986), but in this procedure ammonia or amine is used as a purification aid prior to base hydrolysis using a strongly basic material, preferably sodium or potassium hydroxide, at 20° to 100° C. There is no indication of amidine formation.

While it is recognized that carboxamides can be hydrolyzed under either acidic or basic conditions to amines, from a practical point of view it is said to be advantageous to hydrolyze amides under acidic catalysis, using conditions normally employed for protein degradation. See *Physical Organic Chemistry*, N. S. Isaacs, John Wiley and Sons, New York, (1987) pp. 484–485. In either case, however, when applied to the conversion of poly(N-vinylformamide) (pNVF), inorganic coproducts are formed along with the poly(vinylamine). Base hydrolysis leads to alkali metal salts, such as sodium or potassium formate, while acid hydrolysis gives the corresponding salt of poly(vinylamine) and formic acid. Neutralization provides poly(vinylamine) (pVA) accompanied by a salt of the acid used for hydrolysis and, unless formic acid has been removed, a formate salt.

The desirability of a salt-free product is recognized in U.S. Pat. No. 4,943,676, Pinschmidt, Jr. et al. (1990). The problem is addressed by avoiding the hydrolysis procedure altogether. As disclosed in this patent, pNVF is subjected to a thermolytic reaction by heating to a temperature sufficient to effect thermodecarbonylation and yield a polymer containing free amine functionality. This product also contains amidine linkages formed from adjacent formamide and amine groups with loss of water. The polymer product disclosed contains randomly linked units of vinylamine, amidine and N-vinylformamide. The amidine units are said to be unwanted and can be suppressed by the presence of water which drives the equilibrium reaction back to the amine and formamide moieties.

None of the prior art appears to recognize the desirability of forming the amine-amidine-amide terpolymer disclosed by Pinschmidt, Jr. et al., nor does the art suggest how to obtain such a polymer by hydrolysis of pNVF.

SUMMARY OF THE INVENTION

In accordance with my invention a process is provided which enables the controlled and reproducible production of an amine functional polymer which is a terpolymer of the monomeric units vinylamine, N-vinylformamide and amidine. In making my invention I recognized that this amidine-containing polymer, which is only generally disclosed by Pinschmidt, Jr. et al., cited above, is capable of offering certain advantages, meriting the development of a process for its intended production. According to my invention a terpolymer of vinylamine, N-vinylformamide and amidine is made by subjecting poly(N-vinylformamide) to aqueous hydrolysis at a temperature in the range of 90° to 175° C. under neutral or mildly basic conditions which can include less than 50 weight percent ammonia or amine as the sole hydrolysis agent.

In a preferred aspect of my invention, following hydrolysis, the aqueous solution of polymer and formate, which is a by-product of the hydrolysis, is subjected to degassing conditions which remove ammonia or amine present. This procedure offers at least two advantages. The removal of ammonia or amine at this stage prevents the formation of potentially troublesome solids in downstream equipment during any subsequent removal of impurities involving the discharge of carbon dioxide. Also significant is the production of a novel polymer, poly(vinylammonium formate) (pVAF). When formed in this manner the pVAF is further unique in that it contains no other salts or ionic coproducts. This pVAF can also be viewed as a terpolymer containing vinylammonium formate groups, N-vinylformamide units and amidine units, all randomly linked in the polymer chain. This polymer can be used as a flocculant, a dewatering agent or as a crosslinking agent, particularly in reactions where a blocked agent or delayed crosslinking is desired.

DETAILED DESCRIPTION OF THE INVENTION

The starting polymer for the practice of my invention is a polymer of N-vinylformamide. This polymer should be essentially a homopolymer, although small amounts of comonomeric materials which do not interfere with the hydrolysis reaction can be present. For example, ethylene and styrene are known comonomers polymerizable with NVF and since they are hydrocarbons which merely extend the polymer chain without offering competing hydrolyzing activity, small amounts of such comonomers can be present. Other comonomeric possibilities are available. Procedures for polymerizing NVF are well known in the art as indicated in the citations given in the Background of the Invention. This reaction is typically carried out in aqueous solution using water-soluble azo compounds as initiators.

The molecular weight of the pNVF can vary over a broad range and still be useful in practicing the invention. The polymer should be one which is considered to be normally solid, thereby placing a practical lower limit on its molecular weight, and it should be water soluble, which imposes an upper limit. Beyond that, it can be said that desirably the weight average molecular weights of useful polymers fall in the range of 10,000 up to $10^7$. Preferably these molecular weights will be between 40,000 and $10^6$.

The hydrolysis reaction is carried out with the pNVF in an aqueous solution and in the absence of any strong acid or base normally used in this service, such as HCl or NaOH. The hydrolysis can be successfully performed without any hydrolysis promoting agent at essentially neutral conditions, for example a pH of about 6 to 8. I prefer, however, to use a minor amount of either ammonia or an amine which has a boiling point below 100° C. Such lower boiling amines are preferably lower alkylamines such as methylamine, dimethylamine, trimethylamine, ethylamine, diethylamine, triethylamine, isopropylamine, diisopropylamine, propylamine, and the like. Primary or secondary amines are favored for this service. Ammonia is, however, the preferred agent because of the ease with which it can be added and removed once the hydrolysis is completed. The concentration of ammonia or amine should be below 50 weight percent and is preferably in the range of 0.5 to 35 weight percent. The quantity of water required is that sufficient to keep the polymer in solution.

The temperature of the hydrolysis should be above 90° C. but below 175° C., preferably in the range of 100° to 160° C. At lower temperatures conversion of the formyl groups on the pNVF is insufficient and attempting to overcome this disadvantage by increasing ammonia concentration is counterproductive. At higher temperatures amidine content of the polymer product is less than desired. Hydrolysis above 100° C. is favored for best results and temperatures in the range of about 140° to 160° C. are preferred. The pressure must be sufficient to keep the polymer solution in a liquid phase at the selected temperature.

The time of reaction can readily be determined to best suit the results desired under the conditions chosen for the hydrolysis. The economics of the process will determine the time to a large extent because most of the reaction occurs early in the hydrolysis and a point of diminishing returns may be reached fairly soon. For example, data show that most of the conversion, if it is going to occur, will take place within about two hours although additional reaction continues up to six hours. In general, reaction times are about 0.5 to 12 hours.

Following the hydrolysis step the polymer product can be recovered and worked up in the usual manner, precipitating the polymer from solution followed by washing and extraction or filtration to remove undesirable impurities, depending upon the use for which the product is intended. The process of my invention has the advantage that, under the conditions of the hydrolysis (particularly at the preferred temperatures), formamide is not a significant by-product. Formate ions are present, but these can be dealt with by catalytic decomposition in accordance with another of my inventions which is described in my copending patent application, entitled "Production of Amine Functional Polymers Having Improved Purity", filed Mar. 25, 1993 (Case 186PUS05039). This procedure leads to a salt-free polymer which is desired for some applications which are sensitive to the presence of inorganics. For example, adhesives and coatings require essentially salt-free amine functional polymer. Traditional methods for removal of such impurities involve repeated precipitations, selective extraction or ultrafiltration. These procedures entail tedious and costly routes for removal and disposal of stoichiometric quantities of inorganic co-product.

Although the polymer product can be recovered directly from the hydrolysis reaction mixture, as described above, I prefer to subject the polymer solution following hydrolysis to degassing conditions which cause the volatilization of ammonia or amine present in the mixture, including ammonium and alkylammonium ions associated with by-product formate ions. The degassing can be effected by warming the mixture or lowering the pressure, or both, and can be assisted by physical enhancement such as the use of an inert stripping gas, preferably nitrogen, or by mechanical means which increase the liquid/vapor interfacial surface area. Removal of the ammonia or amine in this manner accomplishes two objectives. In those instances where catalytic decomposition of formate is carried out to provide a salt-free product, the removal of ammonia or amine at this stage following the hydrolysis step eliminates the possibility of ammonia or amine reacting with carbon dioxide decomposition product to form solid carbonate or carbamate products in downstream equipment causing plant downtime. Another objective of the preferred embodiment of my invention is the formation of poly(vinylammonium formate) by the removal of ammonia or amine at this stage of the process. By removing ammonium and alkylammonium ions from the polymer solution following hydrolysis, the invention causes the formate ions present in the solution to associate with the vinylamine groups present in the polymer. This polymer product, poly(vinylammonium formate), can be recovered as a useful product in its own right. Alternatively, it can be used as the preferred feed to catalytic decomposition as described in my copending United States patent application cited above.

The poly(vinylammonium formate) is preferably a terpolymer containing, in random distribution, units of vinylammonium formate, N-vinyl formamide and amidinium formate. This polymer can be represented by the structural formula:

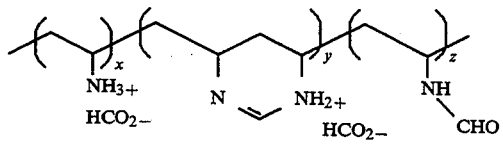

wherein $x+y+z$ equal a sum,
$x$ is 15 to 90 percent of said sum,
$y$ is 5 to 60 percent of said sum, and
$z$ is 5 to 60 percent of said sum.

More preferably the polymer is represented by a formula as given above but in which from 30 to 90 mol percent of the polymer is vinylammonium formate, from 5 to 50 mol percent of the polymer is amidine and from 5 to 30 mol percent is N-vinyl formamide.

The poly(vinylammonium formate) solution formed by the degassing step contains no other salts or ionic coproducts of the hydrolysis. When employed as the feed for catalytic decomposition of the formate ions to produce a salt-free product, enhanced evolution of carbon dioxide is obtained.

The polymer product obtained either by direct recovery in a conventional manner without the above described degassing step, or with degassing followed by catalytic decomposition of formate, is a terpolymer of randomly distributed copolymerized units of vinylamine, N-vinylformamide and amidine. This polymer can be represented by the structural formula:

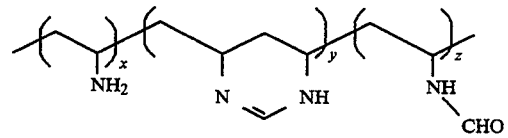

wherein $x+y+z$ equal a sum,
$x$ is 15 to 90 percent of said sum,
$y$ is 5 to 60 percent of said sum, and
$z$ is 5 to 60 percent of said sum.

Preferably, in the structural formula representing the terpolymer from 30 to 90 mol percent of the polymer is vinylamine, from 5 to 50 mol percent of the polymer is amidine, and from 5 to 30 mol percent is N-vinylformamide.

The amidine-containing terpolymer offers enhanced properties in special applications because amidine is a stronger base than amine. Consequently, this terpolymer is capable of performing better than poly(vinylamine) in acid scavenging, ion exchange, flocculation, coagulation, reactive sizing and in anti-static service. The process of this invention provides an improved route to this valuable polymer.

Other advantages and features of my invention will be apparent to those skilled in the art from the following examples which are illustrative only and should not be construed to limit my invention unduly.

EXAMPLES 1–10A

These examples demonstrate aqueous hydrolysis of low molecular weight poly(N-vinylformamide) using ammonia as a hydrolysis promoting agent at elevated temperatures. The pNVF had a weight average molecular weight of about 60,000. The dry, powdered pNVF was added to a 100 mL stainless steel Parr reactor and dissolved in deionized water and/or aqueous ammonia. The reactor was sealed and pressure checked with nitrogen at 500 to 600 psig. In Example 3 anhydrous ammonia was added to the aqueous polymer solution from a pressurized cylinder. Stirring was started and the mixture heated to the desired temperature for the desired length of time. Subsequently the reaction mixture was cooled to room temperature and excess ammonia was vented with no other degassing procedure. The polymer product was recovered and analyzed by $^1$H and $^{13}$C NMR. The results are shown in Tables 1 and 2. With the exception of Example 3 in which conversion was too low and the product was not analyzed, the polymer formed was a terpolymer of vinylamine, amidine and N-vinylformamide.

TABLE 1

| Example | pNVF (gm) | 28% Aq NH$_3$ (ml) | Water (gm) | NH$_3$ (gm) | [NH$_3$] (wt %) | T (°C.) | t(hr) | Conv (%)$^a$ | Selectivity pVA$^b$ | Amidine$^b$ | Formate$^c$ |
|---|---|---|---|---|---|---|---|---|---|---|---|
| 1 | 3.72 | 50.0 | — | — | 28.0 | 100 | 6 | 46 | 61 | 39 | 62 |
| 2 | 3.74 | 50.0 | — | — | 28.0 | 150 | 6 | 91 | 90 | 10 | 94 |
| 3 | 3.73 | — | 20.0 | 22.4 | 53.0 | 100 | 6 | 14 | NA$^d$ | NA$^d$ | NA$^d$ |
| 4 | 3.72 | 25.0 | 25.0 | — | 14.0 | 150 | 6 | 92 | 92 | 8 | 95 |
| 5 | 3.76 | 25.0 | 25.0 | — | 14.0 | 150 | 2 | 86 | 81 | 19 | 96 |
| 6 | 3.75 | 12.5 | 37.5 | — | 7.0 | 150 | 6 | 93 | 86 | 14 | 95 |
| 7 | 3.75 | 6.0 | 44.0 | — | 3.4 | 150 | 6 | 85 | 66 | 34 | 97 |
| 8 | 3.76 | 3.0 | 47.0 | — | 1.7 | 150 | 6 | 87 | 64 | 36 | 97 |
| 9 | 3.75 | 1.5 | 48.5 | — | 0.8 | 150 | 6 | 82 | 50 | 50 | 100 |
| 10 | 3.76 | — | 50.0 | — | 0.0 | 150 | 6 | 52 | 46 | 54 | 100 |

TABLE 1-continued

| Ex-ample | pNVF (gm) | 28% Aq NH₃ (ml) | Water (gm) | NH₃ (gm) | [NH₃] (wt %) | T (°C.) | t(hr) | Conv (%)[a] | Selectivity pVA[b] | Ami-dine[b] | For-mate[c] |
|---|---|---|---|---|---|---|---|---|---|---|---|
| 10A | 3.76 | 35.0[e] | 15.0 | — | 28.0[f] | 150 | 6 | 94 | >98 | <2 | 77[g] |

[a]Mole % of formamide groups hydrolyzed; balance remains as pendant formamide.
[b]Mole %, based on product functional group.
[c]Mole % of hydrolyzed formamide groups converted to formate; balance is formamide.
[d]Not analyzed.
[e]Aqueous methylamine (40 wt %) used instead of aqueous ammonia
[f]Resulting concentration of aqueous ammonia
[g]Mole % of hydrolyzed formamide groups converted to formate; balance is N-methylformamide

TABLE 2

| Example | Selectivity pNVF | pVA | Amidine |
|---|---|---|---|
| 1 | 54 | 28 | 18 |
| 2 | 9 | 8 | 8 |
| 3 | 86 | NA[b] | NA[b] |
| 4 | 8 | 85 | 7 |
| 5 | 14 | 70 | 16 |
| 6 | 7 | 80 | 13 |
| 7 | 15 | 56 | 29 |
| 8 | 13 | 56 | 31 |
| 9 | 18 | 41 | 41 |
| 10 | 48 | 24 | 28 |
| 10A | 6 | >92 | <2 |

[a]Mole % of each functionality in isolated terpolymer.
[b]Not analyzed.

Table 1 shows reaction conditions of temperature, time and hydrolysis medium for each of Examples 1–10 with hydrolysis results in terms of conversion, relative formation of amine and amidine units and by-product identity as formate or formamide. Table 2 shows selectivity of conversion in terms of polymer composition.

A comparison of Examples 1 and 2 shows that although hydrolysis occurred with 28% aqueous ammonia at 100° C., much better results were obtained at 150° C. In Example 1, conversion was lower than desired and a fairly high proportion of the hydrolyzed formamide groups were converted to formamide rather than formate as preferred. Although Example 1 was operative in making terpolymer, neither the conversion nor composition met the preferred objective. Results were far better in Example 2 which operated at 150° C.

In Example 3 an attempt was made to compensate for the lower temperature of 100° C. by increasing ammonia concentration to 53%. Conversion was so low that the polymer formed was not analyzed.

Examples 2, 4 and 6 show that ammonia concentration could be drastically reduced from 28% to 14% and 7% without serious alteration of results. In fact, Example 6 run at 7% ammonia gave the best conversion and highest amidine content among these three Examples.

A comparison of Examples 4 and 5 shows that most of the conversion occurred within the first 2 hours of the reaction. The six hour run of Example 4 favored selectivity to amine rather than amidine. This demonstrates that reaction time can be used in the process of the invention to control terpolymer composition.

Examples 7, 8 and 9 show that good conversions of pNVF were obtained even with quite low concentrations of ammonia, and selectivity to amine units decreased as ammonia concentration decreased. Consequently, this parameter can be manipulated to obtain different amine/amidine ratios. Example 10 was a demonstration of aqueous hydrolysis on pNVF without ammonia or amine. Significant conversion occurred at 150° C. and no formamide by-product was formed in either Example 10 or Example 9 which used 0.8% ammonia. A comparison the these two Examples shows that a very small amount of ammonia makes a big difference in terpolymer composition, changing from 48 mol percent N-vinylformamide units in Example 10 to only 18 mol percent in Example 9. Clearly, the presence of at least a fraction of a percent of ammonia is preferred in the practice of the invention.

A comparison of runs 2 and 10A shows that use of aqueous methylamine provides pVA in very high conversion and selectivity at 150° C.

EXAMPLES 11 AND 12

The procedures of Examples 2 and 6 were repeated using a pNVF of medium molecular weight (weight average molecular weight of about 409,000). Hydrolysis results are given in Table 3.

TABLE 3

| Ex-ample | pNVF (gm) | 28% Aq NH₃ (ml) | Water (gm) | NH₃ (gm) | [NH₃] (wt %) | T (°C.) | t(hr) | Conv (%)[a] | Selectivity pVA[b] | Ami-dine[b] | For-mate[c] |
|---|---|---|---|---|---|---|---|---|---|---|---|
| 11 | 3.75 | 50.0 | — | — | 28.0 | 150 | 6 | 86 | 84 | 16 | 91 |
| 12 | 3.75 | 12.5 | 37.5 | — | 7.0 | 150 | 6 | 91 | 86 | 14 | 94 |

[a]Mole % of formamide groups hydrolyzed; balance remains as pendant formamide.
[b]Mole %, based on product functional group.
[c]Mole % of hydrolyzed formamide groups converted to formate; balance is formamide.

A comparison of Examples 11 and 12 with Examples 2 and 6 from Table 1 shows that polymer molecular weight within the ranges of these Examples does not significantly affect hydrolysis results using the procedures of this invention.

EXAMPLES 13–36

Following essentially the procedures of Examples 2, 4 and 6, terpolymers of vinylamine, amidine and N-vinylformamide were made for use in runs demonstrating catalytic decomposition of contaminating salts and removal of the gaseous products of decomposition. The terpolymers were made by aqueous ammonia hydrolysis of poly(N-vinylformamide). In each of Examples 13 through 36 the terpolymer hydrolyzate (25 mL) was introduced into a 100 mL three-necked round bottom flask equipped with a magnetic stirrer, reflux condenser, and a gas dispersion tube. In Examples 24 and 26 through 29 the hydrolyzate was degassed to remove ammonia by heating to 100° C. for 30 minutes with stirring and passage of nitrogen through the polymer solution at a rate of about 30 to 45 mL per minute. This degassing step converted the terpolymer to poly(-vinylammonium formate) as a terpolymer of vinylammonium formate, amidine and N-vinylformamide.

After degassing the aqueous solutions of pVAF were allowed to cool to 40°-50° C. before beginning the formate decomposition. To these solutions of Examples 24 and 26–29 as well as to the hydrolyzates of the remaining Examples were added appropriate amounts of hydrogen transfer or hydrogenation-dehydrogenation catalyst as identified in Table 4. These catalysts are recognized supported Group VIII metal hydrogen transfer catalysts. The reaction mixtures were stirred and heated to the desired temperature for lengths of time as indicated for each Example in Table 4. In Examples 17 through 36 a nitrogen purge was used to assist in removal of gaseous products of decomposition which were carbon dioxide and hydrogen. Vigorous effervescence was observed in the early stages of the reactions. Subsequently the reaction solutions were cooled to room temperature and the polymer products were recovered by filtration to remove catalyst. Samples were analyzed by $^1$H and $^{13}$C NMR. Typically, the products were terpolymers of vinylamine, amidine and N-vinyl formamide containing little or no formate salt with the relative proportions of each functional monomeric unit essentially the same as for the terpolymers after initial hydrolysis as reported in Table 2. The efficiency of each process was determined from the conversion based upon the mol percent of formate decomposed and by the carbon dioxide evolution in terms of mol percent of the quantity of formate decomposed. The results are reported in Table 4.

C. or 100° C. A comparison of Examples 13 and 14 with Examples 15 and 16 showed that a higher degree of carbon dioxide evolution was obtained at the higher reaction temperature. By comparing Example 17 with Example 15 it can be seen that a nitrogen purge during catalytic decomposition enhanced removal of carbon dioxide.

Example 18 showed that good conversion of formate to carbon dioxide can be obtained with a relatively low loading of 5% palladium on carbon. Comparing these data with those of Example 19, however, shows that the dispersion of the metal on the support may be more important than the total amount of palladium present.

Examples 20–22 showed that palladium supported on alumina, calcium carbonate or barium sulfate was also effective for formate decomposition.

Examples 23 and 24 showed that essentially complete carbon dioxide removal was attained when formate decomposition was carried out at reflux conditions (approximately 100° C.) with a nitrogen purge during the process, and preferably with polymer solution from which ammonia had been degassed prior to catalytic decomposition. A comparison of Examples 25 and 26 confirmed this advantage for ammonia degassing. In these Examples degassing ammonia formed the poly(-vinylammonium formate) prior to formate decomposition with a 10% palladium on carbon catalyst. Example 26 which used pVAF as its feed showed essentially complete removal of carbon dioxide. Both Examples 25 and 26 had high conversions and good $CO_2$ removal. Examples 27–29 further confirmed the advantage of sequential ammonia degassing and use of a nitrogen purge during formate decomposition in obtaining complete $CO_2$ removal.

Examples 30–36 evaluated other hydrogen transfer catalysts in formate decomposition for production of salt-free amine functional polymer. While ruthenium on carbon showed a little activity for formate decomposition (Example 30), the ruthenium supported on alumina used in Example 31 was inactive. Since both carbon and

TABLE 4

| Example | Catalyst (loading)[a] | T(°C.) | t(hr) | Conv (%)[b] | $N_2$ Purge | Initial $NH_3$ Removal | % $CO_2$ Evolved[c] |
|---|---|---|---|---|---|---|---|
| 13 | 5% Pd/C (2.5) | 80 | 6 | 91 | No | No | 51 |
| 14 | 10% Pd/C (2.5) | 80 | 6 | >95 | No | No | <20 |
| 15 | 5% Pd/C (2.5) | 100 | 6 | 94 | No | No | 71 |
| 16 | 10% Pd/C (2.5) | 100 | 6 | 89 | No | No | 84 |
| 17 | 5% Pd/C (2.5) | 100 | 6 | 90 | Yes | No | 78 |
| 18 | 5% Pd/C (1) | 100 | 3.5 | 78 | Yes | No | 82 |
| 19 | 1% Pd/C (5) | 100 | 3.5 | 8 | Yes | No | NA[d] |
| 20 | 5% Pd/Al$_2$O$_3$ (2.3) | 100 | 3.5 | 77 | Yes | No | 60 |
| 21 | 5% Pd/CaCO$_3$ (5) | 100 | 3.5 | 92 | Yes | No | 83 |
| 22 | 5% Pd/BaSO$_4$ (2.4) | 100 | 3.5 | 88 | Yes | No | 88 |
| 23 | 5% Pd/C (2.5) | Reflux | 5 | 87 | Yes | No | 93 |
| 24 | 5% Pd/C (2.5) | Reflux | 5 | 84 | Yes | Yes | 94 |
| 25 | 10% Pd/C (2.5) | Reflux | 6 | 89 | Yes | No | 81 |
| 26 | 10% Pd/C (2.4) | Reflux | 6 | 90 | Yes | Yes | 100 |
| 27 | 5% Pd/C (2) | Reflux | 3.5 | 80 | Yes | Yes | ≧98 |
| 28 | 5% Pd/Al$_2$O$_3$ (2.4) | Reflux | 3.5 | 86 | Yes | Yes | 100 |
| 29 | 5% Pd/CaCO$_3$ (2.4) | Reflux | 3.5 | 90 | Yes | Yes | 100 |
| 30 | 5% Ru/C (2.4) | 100 | 3.5 | 16 | Yes | No | NA[d] |
| 31 | 5% Ru/Al$_2$O$_3$ (2.4) | 100 | 3.5 | 0 | Yes | No | — |
| 32 | 5% Rh/Al$_2$O$_3$ (2.4) | 100 | 3.5 | 9 | Yes | No | NA[d] |
| 33 | 5% Rh/C (2.4) | Reflux | 3.5 | 9 | Yes | No | NA[d] |
| 34 | 5% Pt/C (5) | Reflux | 3.5 | 9 | Yes | No | NA[d] |
| 35 | 5% Pt/Al$_2$O$_3$ (5) | Reflux | 3.5 | 6 | Yes | No | NA[d] |
| 36 | 8% Co/Al$_2$O$_3$ | Reflux | 3.5 | 10 | Yes | No | NA[d] |

[a]Wt % catalyst (dry basis), based on volume of hydrolyzate.
[b]Mole % formate decomposed.
[c]Mole %, based on quantity of formate decomposed.
[d]Not analyzed.

As shown by the data of Table 4, Examples 13–16 demonstrated that high conversions of formate to carbon dioxide can be obtained with either 5% or 10% palladium supported on graphitic carbon at either 80° alumina supports performed well for palladium (Examples 27 and 28) and ruthenium/carbon showed some activity, it is believed that conditions can be found without undue experimentation under which $Ru/Al_2O_3$ is operative. Examples 32–36 showed operability but low activity for supported rhodium, platinum and cobalt. Clearly, supported hydrogen transfer catalysts with palladium as the preferred Group VIII metal are useful for this process.

Other embodiments of my invention will be apparent to those skilled in the art from the foregoing disclosure without departing from the spirit or scope of the invention.

I claim:

1. A terpolymer comprising randomly linked units of vinylammonium formate, N-vinylformamide and amidine, which is not contaminated by other salts or ionic coproducts.

2. A random terpolymer according to claim 1 having the structure of the formula:

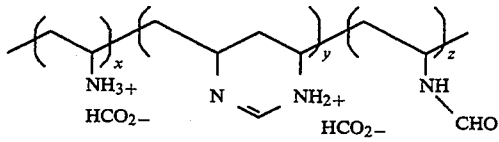

wherein x+y+z equal a sum,
x is 15 to 90 percent of said sum,
y is 5 to 60 percent of said sum, and
z is 5 to 60 percent of said sum.

* * * * *